United States Patent [19]

Riffle et al.

[11] Patent Number: 5,098,954
[45] Date of Patent: Mar. 24, 1992

[54] POLYALKYLVINYL ETHER/POLYALKYLOXAZOLINE COPOLYMERS, PROCESSES FOR MAKING, AND USES

[75] Inventors: Judy S. Riffle; Gurudus D. Sinai-Zingde, both of Blacksburg, Va.

[73] Assignee: Virginia Tech Intellectual Properties Inc., Blacksburg, Va.

[21] Appl. No.: 609,273

[22] Filed: Nov. 5, 1990

Related U.S. Application Data

[62] Division of Ser. No. 355,710, May 23, 1989, Pat. No. 4,988,772.

[51] Int. Cl.$^5$ .................... C08F 216/12; C08L 71/00
[52] U.S. Cl. .................... 525/186; 525/91; 525/92; 525/280; 525/328.9; 525/375; 525/412
[58] Field of Search .............. 525/91, 92, 280, 328.9, 525/375, 412, 186

[56] References Cited

U.S. PATENT DOCUMENTS 4,849,471  7/1989  Saito et al. ............... 525/92
4,883,836  11/1989  Thill ......................... 525/92

Primary Examiner—John C. Bleutge
Assistant Examiner—Vasu S. Jagannathan
Attorney, Agent, or Firm—Richard P. Fennelly; Louis A. Morris

[57] ABSTRACT

Graft and block copolymers of polyalkylvinyl ether and polyoxazoline moieties can be used as polymeric compatibilizers.

7 Claims, No Drawings

POLYALKYLVINYL ETHER/POLYALKYLOXAZOLINE COPOLYMERS, PROCESSES FOR MAKING, AND USES

This is a division of application Ser. No. 355,710 filed May 23, 1989 now U.S. Pat. No. 4,998,772.

BACKGROUND OF THE INVENTION

1. Field of the Invention

The present invention relates to novel copolymers suitable for use as polymeric compatibilizers.

2. Description of the Prior Art

The blending of certain types of copolymer compositions (e.g., block copolymers) with other polymers, either homopolymers or copolymers, is an industrially advantageous technique for the production of new polymeric materials with desirable properties. It is known that certain carefully defined block or graft copolymers possessing separate component blocks compatible with each of two homopolymers to be blended can act as emulsifiers for the blends.

Polyalkylvinyl ethers are compatible with a number of high volume, commercial polymers, for example, polystyrene. (See O. Olabisi et al. "Polymer-Polymer Miscibility", Academic Press, N.Y., 1979 and D. R. Paul et al., "Polymer Blends", Vol. 2, Academic Press, N.Y., 1978.)

Poly(2-ethyloxazoline) has been demonstrated to be miscible with certain polymers including styreneacrylonitrile copolymers containing 25%, 40%, and 70% acrylonitrile, selected polyvinyl chloride/polyvinylidene chloride resins, phenoxy resins (see H. Keskkula et al., J. Appl Polymer Sci., Vol. 31, 1189-1197, 1986), styrene/acrylic acid copolymers, and styrene/maleimide copolymers (B. D. Dean, J. Appl. Polymer Sci. Vol. 34, 887-890, 1987).

It is known to form polysiloxane/poly(oxazoline) copolymers (U.S. Pat. No. 4,659,777 to J. S. Riffle et al.).

SUMMARY OF THE INVENTION

The present invention relates to block and graft copolymers of polyalkylvinyl ethers and polyalkyloxazolines and the use of such copolymers as polymeric blend compatibilizers, e.g., for polyamides and polyolefins. The processes for forming such block and graft copolymers also forms a part of the invention.

DETAILED DESCRIPTION OF THE INVENTION

As used herein, the terminology "block" copolymer is intended to connote copolymers of the structure $-(A)_x-(B)_y-$, $-(A)_x-(B)_y-(A)_x-$, or $-(B)_y-(A)_x-(B)_y-$, where A is polyalkylvinyl ether moiety and B is the polyoxazoline moiety with x and y being integers over 1. Graft copolymers, on the other hand, are of the formula

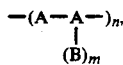

with n and m having the same meaning given above for x and y, where the main backbone chain has grafted side chains, containing the other polymeric moiety, attached at various points.

In both of the copolymeric structures described above, the instant copolymers have a polyalkylvinyl ether moiety as "A". This moiety is of the formula

where R can be aryl or alkyl. The moiety "B" is a polyoxazoline of the general formula

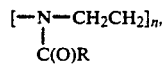

where R can be as defined above. The polyoxazoline materials are further described at Col. 2, lines 14-50 of U.S. Pat. No. 4,547,530, which is incorporated herein by reference.

The graft copolymers of the present invention can be conveniently prepared by first copolymerizing an alkylvinyl ether and a minor amount of a (e.g., an ethylvinyl ether or a methylvinyl ether) haloalkylvinyl ether (e.g., alkyl in both cases being ethyl and halo being chloro) using a suitable catalyst (e.g., aluminum hydrosulfate hydrate). Example 1 illustrates how a preferred catalyst can be synthesized. Then, polyoxazoline grafts can be formed from the halogen-containing alkylvinyl ether by initiating an alkyloxazoline monomer (e.g., 2-ethyloxazoline) with the pendant halo atom in the first formed copolymer using a suitable promoter (e.g., sodium iodide). Examples 2 and 3 illustrate this procedure.

Diblock and triblock copolymers can be formed by a procedure wherein an alkyl halogen-containing initiator is first used to polymerize the polyalkyloxazoline block and then a Lewis acid is added to promote the crossover reaction between the polyoxazoline block and a polyalkylvinyl ether block. Then, subsequently, the polyalkylvinyl ether blocks can be formed. Example 4 illustrates formation of diblock copolymers.

The length of the polyalkylvinyl ether units in the copolymers of the present invention can be varied widely and preferably are in the range of from about 5 to about 1500 (average value), whereas the length of the polyalkyloxazoline units is from about 5 to about 1500 (average value). The length of the respective units can be suitably controlled by the amounts of the respective reactants.

The copolymers described herein are deemed to be useful as compatibilizers for blends also containing polyamides (e.g., nylon 6) and polyolefins (e.g., polypropylene). These two classes of polymers are incompatible. The former have high strength and have a high melt temperature, but are moisture sensitive. The latter are inexpensive, hydropholic and possibly surface active. Compatibilized blends of these two disparate polymer classes would be of interest.

The instant invention is further illustrated by the Examples which follow.

EXAMPLE 1

This Example describes the preparation of an aluminum hydrosulfate hydrate catalyst for use in the Examples described hereinafter.

The catalyst was prepared according to the method of Lal, et al., J. Polym. Sci., Pt. A-1, 1967, 5, 795. Finely powdered $Al_2(SO_4)_3 \cdot 18\ H_2O$ (30 grams) and 150 ml of concentrated sulfuric acid was heated to 90° C. for four hours. After cooling, it was carefully added under a nitrogen blanket to 1.2 liters of ether. The white precipitate was filtered under a blanket of nitrogen. A heavy paste was formed. Thus, filtration becomes quite difficult toward the end of this process. The paste-like material was transferred to another funnel and was washed three times with ether. The residue was dried in vacuo at 35° C. for three days.

EXAMPLE 2

This Example illustrates the copolymerization of vinyl ethyl ether and 2-chloroethyl vinyl ether (1 mole % 2-chloroethyl vinyl ether).

Aluminum hydrosulfate hydrate catalyst (0.15 gram) prepared as described above in Example 1 was suspended in 60 ml of previously dried and distilled pentane and cooled in an ice bath for thirty minutes. All reactions done with vinyl ether monomers were performed in reaction vessels protected from light. A solution of 10.6 ml (0.111 mole) ethyl vinyl ether and 0.12 ml (0.00111 mole) 2-chloroethyl vinyl ether in 5 ml pentane was precooled in an ice bath, then added via cannula to the catalyst solution over a thirty minute period. During this period, the reaction mixture turned a light yellow color. The mixture was stirred at about 4° C. for eight hours. Proton nmr showed no monomer remaining. The reaction was terminated with $CH_3OH/NH_4OH$ then warmed to room temperature and stirred for two additional hours. The pentane was evaporated, and the copolymer was redissolved in ether. The ether layer was washed with water, brine, dried over magnesium sulfate, decanted, and the solvent was again evaporated. The resultant copolymer was dried at 35° C. in a vacuum oven to constant weight.

EXAMPLE 3

This Example describes the polymerization of poly)2-ethyloxazoline) grafts on the copolymer of vinyl ethyl ether and 2-chloroethyl vinyl ether described in Example 2. The composition from this Example is about 80% vinyl ethyl ether/chloroethyl vinyl ether copolymer and about 20% poly(2-ethyloxazoline).

The copolymer described above (4.7 grams) and 0.1033 grams dry NaI (1.1 moles per mole chloroethyl ether) were dissolved in 40 ml dry chlorobenzene plus 2 ml dry acetone. Dried and distilled 2-ethyloxazoline (1.2 ml) was subsequently added, and the polymerization was allowed to proceed at 105°-120° C. until the disappearance of monomer was complete. The graft copolymer solution was cooled to room temperature and terminated by adding 2 equivalents of alcoholic potassium hydroxide.

This Example describes the preparation of poly(n-butyl vinyl ether)/poly(2-ethyloxazoline) diblock copolymers.

A flame dried flask was charged with 1 gram (0.01 mole) of previously dried 2-ethyloxazoline and 3 ml of dry chlorobenzene. Benzyl iodide initiator (0.218 gram) was added, and the reaction mixture was heated to 110°-120° C. and maintained at that temperature until polymerization was complete as determined by proton nmr which clearly showed the presence of the oxazolinium ion end group at this point in the procedure. The light yellow solution was cooled to room temperature, and 2 ml of a 0.5 molar solution of zinc iodide in acetone (0.001 mole) was added. A white solid precipitate formed. The flask was immersed in an oil bath (about 100° C.), and, after five minutes, a homogeneous solution was obtained. During this period, the color of the solution became orange. The flask was again cooled to room temperature and stirred for one hour. Proton nmr showed the disappearance of the oxazolinium ion. N-butyl vinyl ether (0.77 gram) was then added, and the flask was immersed in the 100° C. oil bath until a homogeneous orangish mixture was formed. This was stirred at room temperature for twelve hours. Proton nmr indicated that the reaction was complete. The reaction was terminated with ammoniacal methanol and was stirred overnight. A clear orange solution was obtained The foregoing Examples have been presented to illustrate certain embodiments of the invention and should not therefore be construed in a limiting sense. The scope of protection which is sought is set forth in the claims which follow.

We claim:

1. A compatibilized blend of polyamide and polyolefin containing a copolymer of a polyalkylvinyl ether and a poly(2-alkyl-2-oxazoline) as a compatibilizer.

2. A blend as claimed in claim 1 wherein the respective polymers of the copolymer have an average chain length of from about 5 to about 1500 units.

3. A blend as claimed in claim 1 wherein the polyalkylvinyl ether is selected from the group consisting of polymethylvinyl ether and polyethylvinyl ether.

4. A blend as claimed in claim 1 wherein the poly(2-alkyl-2-oxazoline) is poly(2-ethyl-2-oxazoline).

5. A blend as claimed in claim 1 wherein the polyalkylvinyl ether has an average chain length of from about 5 to about 1500 units and is selected from the group consisting of polymethylvinyl ether and polyethylvinyl ether.

6. A blend as claimed in claim 1 wherein the poly(2-alkyl-2-oxazoline) is poly(2-ethyl-2-oxazoline) and has an average chain length of from about 5 to about 1500 units.

7. A blend as claimed in claim 5 wherein the poly(2-alkyl-2-oxazoline) is poly(2-ethyl-2-oxazoline) and has an average chain length of from about 5 to about 1500 units.

* * * * *